No. 890,374. PATENTED JUNE 9, 1908.
E. H. PRYOR.
CABLE SWITCH.
APPLICATION FILED JULY 16, 1907.
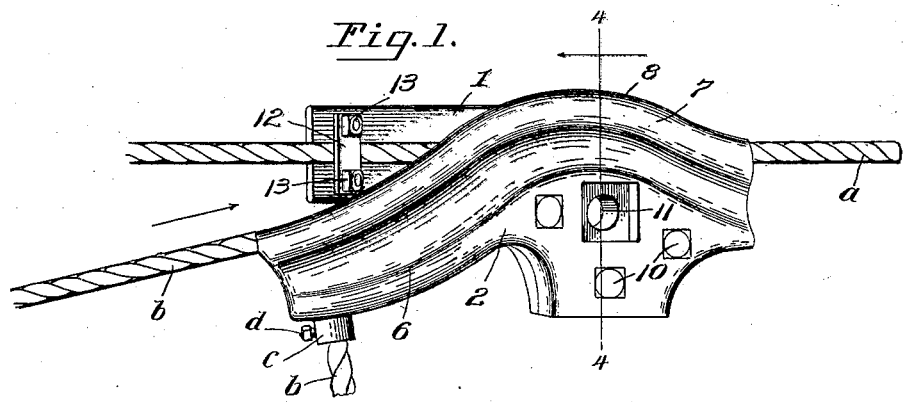
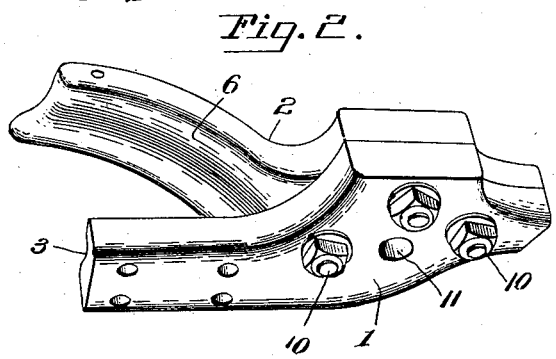
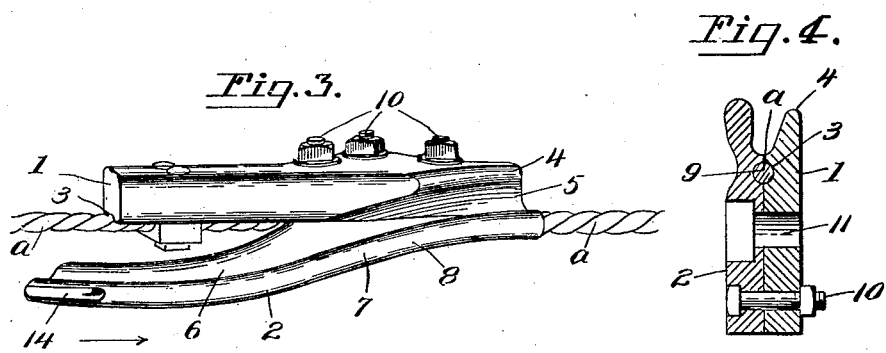
Witnesses
F. C. Gibson.
J. W. Garner
Inventor
Edward H. Pryor.
By Victor J. Evans
Attorney

UNITED STATES PATENT OFFICE.

EDWARD H. PRYOR, OF MEDINA, NEW YORK.

CABLE-SWITCH.

No. 890,374.   Specification of Letters Patent.   Patented June 9, 1908.

Application filed July 16, 1907. Serial No. 384,021.

*To all whom it may concern:*

Be it known that I, EDWARD H. PRYOR, a citizen of the United States of America, residing at Medina, in the county of Orleans and State of New York, have invented new and useful Improvements in Cable-Switches, of which the following is a specification.

This invention is an improved cable switch for use in suspending an electric conducting cable from a messenger or supporting wire or cable, and the said invention consists in the construction, combination and arrangement of devices hereinafter described and claimed.

The object of this invention is to provide an improved cable switch which may be attached to a messenger or supporting wire or cable and to a guide or inclined supporting wire or cable to enable an aerial electric conducting cable to be carried up to the supporting or messenger wire or cable by the guide and cause the suspending hooks of the conducting cable to be directed by the switch onto the supporting wire or cable by merely drawing the conducting cable lengthwise parallel with the supporting cable and obviating the necessity of employing workmen on the poles to which the supporting wire or cable is attached in hanging the conducting cable from such supporting cable, thus greatly facilitating the suspending of the aerial electric conducting cable and enabling the same to be done very cheaply and expeditiously.

In the accompanying drawing,—Figure 1 is a side elevation of a cable switch embodying my invention, showing the same attached to a supporting cable and to a guide or inclined cable. Fig. 2 is an inverted perspective view of the same. Fig. 3 is a perspective view showing the upper side of the same. Fig. 4 is a vertical transverse sectional view of the same.

In the embodiment of my invention here shown the cable switch comprises a pair of separable members 1 and 2. The member 1 constitutes an arm which is straight, is adapted to lie parallel with the supporting cable $a$ and is provided on its inner side with a longitudinal groove 3 to receive one side of such supporting cable. One end of such arm or member 1, which I will term the rear end thereof, is provided with a downwardly inclined head or flange 4 and at the inner side of the said head the upper portion of said arm or member is provided with an obliquely extending groove 5, for the purpose hereinafter stated.

The arm or member 2 has its front portion downwardly inclined, as at 6, and said arm or member 2 is inclined laterally with respect to the arm or member 1 and converges thereto at the rear end thereof and is, moreover, provided on its upper side with a head flange 7 adapted to enable the movable suspending hooks of an aerial cable to travel longitudinally thereover. The intermediate portion of the said head is elevated above the head of the arm or member 1, as at 8, and the rear end of such head 7 terminates in the vertical plane of and directly above the cable $a$, as shown in Fig. 3, so that an aerial electric conducting cable suspending hook which is caused to slide longitudinally on said head 7 in the direction of the arrow will, as it leaves such head 7, pass directly on the supporting cable $a$ so as to suspend such conducting cable from such cable $a$, as will be understood, the raised portion 8 of such head causing the said hook to clear such cable $a$, as such hook approaches such cable angularly and passes above the same. The said arm or member 2 has its rear portion provided on the side which is opposed to the arm or member 1 with a groove 9 which, together with the groove 3 of such arm or member 1, serves to receive such supporting cable $a$ so that the cable switch is disposed in effect with its arms or members aside of such supporting cable. Such arms or members are further provided with depending portions at a suitable distance from their inner ends, which depending portions are provided with registering transverse openings for the reception of bolts 10 which are employed to secure such arms or members detachably together. Such arms or members are also provided with registering openings 11 for the reception of a securing pin or bolt, which, when the cable switch happens to be directly abreast of a telegraph pole or the like support, may be employed to secure such cable switch to such pole or support. To secure the arm or member 1 parallel with the supporting wire or cable $a$ I employ suitable devices, such as a clamping bar or plate 12 and bolts 13 to secure such bar or plate to the inner side of such arm or member 1.

The lower front end portion of the arm or member 2 is provided with an opening 14 to receive the upper end of an inclined or guide cable $b$ to enable such cable $b$ to be attached to such arm or member 2. I here show a collar $c$ and a set screw $d$ for coaction with the end of such cable $b$ to secure the latter to such arm or member 2.

In the operation of the cable switch, after the latter has been attached to the cable $a$ and the inclined guide cable $b$ which rises from the street or roadway has been attached to the arm or member 2, the conducting cable to be suspended from the wire or cable $a$ is drawn longitudinally under and parallel with such cable $a$ with its suspending hooks, which are of the usual construction, engaged with the guide cable $b$. As the said conducting cable is thus moved, such suspending hooks slide upwardly on the cable $b$ until they reach the edge 7 of the member 2, when such head of such member serves to direct such suspending hook over and on to the supporting cable, thus rendering it entirely unnecessary to employ workmen on the poles or other supports of the supporting wire $a$, also enabling the conducting cable to be very economically and expeditiously suspended from such supporting cable.

I do not desire to limit myself to the construction, combination and arrangement of devices herein shown and described, as it is evident that modifications may be made therein within the scope of the appended claims.

Having thus described the invention, what is claimed as new, is:—

1. A cable switch comprising a pair of separable members, and means to secure them together and on opposite sides of a supporting cable, one of such members having an inclined portion provided with means whereby an inclined cable may be attached thereto, and a laterally extending guiding portion to direct the supporting hooks of an electric-conducting cable along the inclined portion and onto the said supporting cable.

2. A cable switch having two arms converging in one direction, one of such arms being adapted to lie against and engage a supporting cable, the other being adapted for the attachment of a guiding cable thereto and presenting an inclined and laterally extending guide to direct the supporting hooks of an electric conducting cable from the guiding cable onto the supporting cable.

3. A cable switch adapted to engage and lie supported by a supporting cable and provided with a pair of arms, one to lie parallel with such supporting cable and the other to lie at an angle thereto, the last-mentioned arm having means for the attachment of a guiding cable thereto and presenting a guide to direct the supporting hooks of an electric conducting cable along the angularly disposed arm and onto the supporting cable.

4. A cable switch adapted to engage and lie supported by a supporting cable and provided with a pair of arms, one to lie parallel with such supporting cable and the other to lie at an angle thereto, the last mentioned arm having means for the attachment of a guiding cable thereto and presenting a guide to direct the supporting hooks of an electric conducting cable along such angularly disposed arm and onto the supporting cable, said arms being separable, and having recesses in their opposing sides to receive the supporting cable, and means to detachably secure such arms together.

5. A cable switch adapted to engage and lie supported by a supporting cable and provided with a pair of arms, one to lie parallel with such supporting cable and the other to lie at an angle thereto, the last mentioned arm having means for the attachment of a guiding cable thereto and presenting a guide to direct the supporting hooks of an electric conducting cable along such angularly disposed arm and onto the supporting cable, said arms being separable, and having recesses in their opposing sides to receive the supporting cable, and means to detachably secure such arms together, such arms being further provided with registering openings for the reception of a device to secure such switch to a pole or other support.

6. A cable switch comprising a pair of members for engagement with opposite sides of a supporting cable, one of such members having an inclined portion provided with means whereby an inclined cable may be attached thereto, and a laterally extending guiding portion to direct the supporting hooks of an electric conducting cable along such laterally extending guiding portion and onto the said supporting cable.

7. A cable switch comprising a pair of members for engagement with opposite sides of a supporting cable, one of such members having an inclined portion provided with means whereby an inclined cable may be attached thereto, and a laterally extending guiding portion to direct the supporting hooks of an electric conducting cable along such laterally extending guiding portion and onto the said supporting cable, the other member having a laterally extending terminal portion on its upper side to clear the upper portion of such hooks.

In testimony whereof, I affix my signature in presence of two witnesses.

EDWARD H. PRYOR.

Witnesses:
Wm. R. Conkling,
Jessie A. Pryor.